United States Patent [19]

Distaso

[11] Patent Number: 5,605,579
[45] Date of Patent: Feb. 25, 1997

[54] AMMONIUM BICARBONATE/AMMONIUM CARBAMATE ACTIVATED BENZYL ALCOHOL PAINT STRIPPER

[75] Inventor: John Distaso, Orange, Calif.

[73] Assignee: Elf Atochem North America, Inc., Philadelphia, Pa.

[21] Appl. No.: 518,286

[22] Filed: Aug. 23, 1995

Related U.S. Application Data

[62] Division of Ser. No. 340,919, Nov. 17, 1994, Pat. No. 5,569,410.

[51] Int. Cl.$^6$ ........................................................ B08B 7/00
[52] U.S. Cl. .............................. 134/38; 510/202; 510/206
[58] Field of Search ............................. 134/38; 252/171, 252/163, 144; 510/202, 206

[56] References Cited

U.S. PATENT DOCUMENTS

| | | | |
|---|---|---|---|
| 1,034,819 | 8/1912 | Nicles. | |
| 1,467,654 | 9/1921 | Scoles. | |
| 1,495,547 | 5/1924 | Clark. | |
| 3,356,614 | 12/1967 | Gilbert | 252/171 |
| 3,463,735 | 8/1969 | Stonebraker et al. | 252/137 |
| 4,071,645 | 1/1978 | Kahn | 427/340 |
| 4,120,810 | 10/1978 | Palmer | 252/153 |
| 4,135,947 | 1/1979 | Rink | 134/4 |
| 4,414,128 | 11/1983 | Goffinet | 252/111 |
| 4,445,939 | 5/1984 | Hodson | 134/2 |
| 4,732,695 | 3/1988 | Francisco | 252/162 |
| 4,927,556 | 5/1990 | Pokorny | 252/173 |
| 5,015,410 | 5/1991 | Sullivan | 252/166 |
| 5,188,666 | 2/1993 | Boccardo | 134/7 |
| 5,259,848 | 11/1993 | Terry et al. | 8/111 |
| 5,387,363 | 2/1995 | Distaso | 252/163 |

FOREIGN PATENT DOCUMENTS

| | | |
|---|---|---|
| 75002 | 7/1970 | Germany. |
| 2142103 | 3/1973 | Germany. |
| 242419 | 1/1987 | Germany. |
| 912539 | 4/1991 | South Africa. |
| 2167083 | 5/1986 | United Kingdom. |

OTHER PUBLICATIONS

The Merck Index—Tenth Edition—p. 76.
Catalog of Aldrich Chemical Company, Inc 1992, p. 87.
Hawley's Condensed Chemical Dictionary, Van Nostrand Reinhold Company; 1993 pp. 64 & 66.

Primary Examiner—Jill Warden
Assistant Examiner—Alexander Markoff
Attorney, Agent, or Firm—Seidel, Gona, Lavorgna & Monaco, P.C.

[57] ABSTRACT

Stripping action of an alkaline paint stripper is improved when ammonia is partially or completely replaced with ammonium bicarbonate or chemical equivalent thereof which decomposes into ammonia and carbon dioxide. A benzyl alcohol solvent system containing at least ammonium bicarbonate is preferably a water-in-oil emulsion emulsified with oleic hydroxyethyl imidazoline and thickened with hydroxypropyl cellulose or hydroxypropyl methylcellulose. A mixture of ammonium carbamate and ammonium bicarbonate identified as ammonium carbonate is the preferred activator for this alkaline paint stripper. Improved stripping can also be provided by reacting ammonium bicarbonate and ammonia in situ within the water-in-oil emulsion.

17 Claims, No Drawings

AMMONIUM BICARBONATE/AMMONIUM CARBAMATE ACTIVATED BENZYL ALCOHOL PAINT STRIPPER

This application is a division of U.S. patent application Ser. No. 08/340,919 filed Nov. 17, 1994, now U.S. Pat. No. 5,569,410.

FIELD OF THE INVENTION

The present invention relates to alkaline paint strippers containing benzyl alcohol as a solvent. In particular the invention relates to an alkaline paint stripper containing ammonium bicarbonate/carbamate activator.

BACKGROUND OF THE INVENTION

U.S. Pat. No. 4,445,939 disclosed a paint stripping and conditioning solution comprising a chlorinated solvent and a liquid alcohol such as benzyl alcohol and a wetting composition which comprises a basic metal ammonium salt of an aromatic sulfonic acid and a non-ionic surface active material. In the preparation of the metal ammonium salt the pH is adjusted to 9.8 with ammonium hydroxide.

U.S. Pat. No. 3,463,735 disclosed an aqueous cleaning composition for glass comprising both a low boiling and high boiling solvent, an alkylarylsulfonate surfactant, an alkali metal polyphosphate and ammonia.

U.S. Pat. No. 4,414,128 disclosed a composition for cleaning hard surfaces comprising a polar solvent such as benzyl alcohol, a terpene solvent, an alkylarylsulfonate surfactant, an additional solvent such as isopropanol and an alkaline material such as ammonium carbonate.

UK Patent Application GB 2 167 083 A disclosed an aqueous no-rinse hard surface cleaning composition containing a surfactant, isopropanol, benzyl alcohol, and a fugative alkaline material such as ammonia.

South African Patent Publication ZA 91/2539 entitled "IMPROVED PROCESS FOR REMOVING COATINGS FROM SENSITIVE SUBSTRATES, AND BLASTING MEDIA USEFUL THEREIN" disclosed abrading paint from aircraft with 100–500 micron water-soluble bicarbonate particles. Sodium bicarbonate is preferred but other alkali metal bicarbonates or ammonium bicarbonate are identified as being useful in combination with hydrophilic silica as the blasting media.

German Patent DD 242 419 A1 disclosed stripping old polyurethane paint from aluminum using methylene chloride, tetrahydonaphthalone, acetic butyl ester and aqueous ammonia. This alkaline formulation was intended to replace corrosive and environmentally polluting formulations containing phenol and formic acid.

German Patent DD 75 002 disclosed stripping paint from iron and non-ferrous metals using mono-chloroacetic acid, adipic acid and ammonium nitrate at temperatures of from 40° to 130° C. This acidic formulation was intended to remove scale and rust as well as paint and primer.

German Patent DE 2 142 103 disclosed stripping nickel, cobalt and copper with an alkaline bath comprising a nitrobenzyl sulfonate sodium salt and a major portion of an ingredient identified incorrectly as ammonium carbonate. Actually "ammonium carbonate" was a mixture of ammonium bicarbonate and ammonium carbamate.

Yet in spite of what was known concerning alkaline paint strippers, it was not previously known nor suggested to use substances other than ammonium nitrate or ammonia and water as activators for alkaline paint strippers.

SUMMARY OF THE INVENTION

An object of the invention is to provide an improved alkaline paint stripper wherein ammonia is partially or completely replaced by ammonium carbamate and/or ammonium bicarbonate or chemical equivalents thereof capable of releasing both ammonia and carbon dioxide.

A preferred object is to provide a water-in-oil emulsion paint stripper or coatings remover containing an effective amount of at least ammonium carbamate or ammonium bicarbonate wherein the solvent system is a benzyl alcohol phase. A preferred addition is a commercially available material identified as "Ammonium Carbonate" which in fact is a mixture of ammonium carbamate and ammonium bicarbonate.

Preferred thickening agents are hydroxypropyl cellulose and hydroxypropyl methylcellulose.

DETAILED DESCRIPTION OF THE INVENTION

It was both a surprising and unexpected result to find that a benzyl alcohol solvent paint stripper gave improved stripping performance when ammonia was replaced with a commercially available material identified as "Ammonium Carbonate". However the assay of ammonia for this material was not consistent with it being a mixture of ammonium carbonate and ammonium bicarbonate. What was and is offered for sale under the name ammonium carbonate is properly identified in the literature as a mixture of ammonium carbamate and ammonium bicarbonate. It was discovered that addition of only ammonium bicarbonate to a benzyl alcohol formulation improved stripping action significantly, but the combination of ammonia and ammonium bicarbonate provided the best stripping action equivalent to use of the commercially available "Ammonium Carbonate".

Salts containing no trace of ammonium bicarbonate or ammonium carbamate or chemical equivalents thereof were found to be ineffective in improving stripping action and included: sodium bicarbonate, potassium bicarbonate, ammonium nitrate, ammonium citrate, ammonium sulfate, ammonium formate, ammonium oxalate and ammonium adetate.

Ammonium carbonate is often the word used in a patent abstract when in fact the chemical species actually used in the patent examples is ammonium bicarbonate. Ammonium bicarbonate is known to Chemistry students from the Solvay process, which may lead them to believe that ammonium carbonate is also a well known chemical.

There are three other ammonium salts with similar appearance and properties which decompose to release ammonia and carbon dioxide. In order as they appear in the Handbook of Chemistry and Physics:

| Ammonium carbamate | $NH_4NH_2CO_2$ | 78.07 |
|---|---|---|
| Ammonium carbamate acid carbonate | $NH_4NH_2CO_2.NH_4HCO_3$ | 157.13 |
| Ammonium carbonate | $(NH_4)_2CO_3.H_2O$ | 114.10 |
| Ammonium bicarbonate | $NH_4HCO_3$ | 79.06 |

As listed in the Merck Index No. 519 Ammonium Carbonate is a mixture of ammonium bicarbonate and ammonium carbamate obtained by subliming a mixture of ammonium sulfate and calcium carbonate. In Merck Index No. 518 Ammonium Carbamate or ammonium aminoformate is the "anhydride" of ammonium carbonate prepared from dry ice and liquid ammonia. The Handbook of Chemistry and Physics lists ammonium carbamate acid carbonate (synonym sal volatile) as a white crystal which similarly sublimes into carbon dioxide and ammonia. Aforementioned DE 2 142 103 recognized that in 1971 mixtures of ammonium carbamate not ammonium hydrogen carbonate (ammonium bicarbonate) were incorrectly called "ammonium carbonate."

The commercially available "Ammonium Carbonate" was determined by experimentation to be a chemical equivalent of an in situ reaction between ammonium bicarbonate and ammonia. What was originally believed to be a pH buffering effect was in fact determined to be unrelated to the influence of pH. While it is not known with any degree of certainty, it is possible that the species or combination of species responsible for improving stripping activity involve unknown intermediates or transitory complexes responsible for breaking the metal to primer bonding. U.S. Pat. No. 5,015,410 disclosed that in an acidic paint stripper an accelerator such as formic acid or acetic acid was believed to chemically attack the organic binder of the coating and thereby weaken the adhesion and cohesion of the coating.

In addition to the use of at least ammonium bicarbonate/carbamate or some other chemical equivalent such an in situ equivalent as an activator, retardation of evaporation of water as the most volatile ingredient can be achieved by dissolving or blending paraffin wax or other evaporation retardant into the continuous, organic phase of the mixed phase emulsion. The wax in the organic phase is soluble, but preferably minimally soluble. As such the amount of wax present is slightly in excess (1% by weight) of that which would saturate the organic phase; and, so as to reduce flammability, the bulk of this organic phase is less volatile than water.

There are many materials (or combinations thereof) which may serve as the organic phase of the mixed phase water-in-oil emulsion, depending on the end use, such as hydrocarbons (including petroleum distillates, both aromatic and aliphatic), alcohols, ketones, ethers, esters, and amines. For an alkaline paint stripper a preferred material as the major component of the organic phase is benzyl alcohol.

Useful additions for these water-in-oil emulsion paint stripper or coating removing formulations include, but are not limited to, oleic hydroxyethyl imidazole, sodium hydroxide, sodium silicate, 2-mercaptobenzotriazole, hydroxypropyl cellulose, hydroxypropyl methylcellulose, xanthan gum, toluene triazole, sodium polymethacrylate, mineral or paraffin oil, propylene glycol, ethoxylated nonylphenol and sodium xylene sulfonate surfactants.

While the invention has particular industrial applicability to paint stripping and coating removal of epoxy and polyurethane, it is not limited thereto and may be employed in a general sense to mixed phase alkaline emulsions.

The following procedures and examples, which are not intended to be limiting, illustrate the practice of the invention.

PROCEDURE A

PROCESS FOR PREPARING ALKALINE PAINT STRIPPER BATCH

Paint stripper batches were prepared by combining three premix batches and topping off with water. While it was possible to prepare formulations by simply mixing together all ingredients, longer mixing times and higher shear mixing was required.

First premix In addition to at least emulsifier and benzyl alcohol a portion of aromatic hydrocarbon solvent consisting of aromatic petroleum distillate was used to pre-wet the hydroxypropyl cellulose or hydroxypropyl methylcellulose to prevent lumping. With larger mixing times or more active stirring the pre-wet step is not needed. The emulsifying agent, corrosion inhibitor(s) and other oil soluble ingredients for the first premix, which serves as the continuous organic phase, may be incorporated at this point.

Second Premix This aqueous phase contains water and commercially available "ammonium carbonate" or ammonium bicarbonate which may be further be reacted with ammonia or a source of ammonium carbamate. This aqueous phase is mixed with the organic phase in the presence of a thickening agent or an emulsifying agent such as oleic hydroxyethyl imidazoline to produce the water-in-oil emulsion. In the emulsification process the first premix and the second premix combine to produce a dispersed aqueous phase in a continuous organic (oleaginous) phase.

Third Premix A portion of petroleum distillate or mineral oil was used to pre-dissolve the paraffin wax. Upon adding this third premix to the mixed phase emulsion the organic phases are combined and remain separate from the aqueous phase in the form of a water-in-oil emulsion. As an alternative to adding the wax as a solution, melted wax can be added directly to the first premix with heating and mixing, thereby eliminating the need for this petroleum distillate.

EXAMPLE 1

A water base paint remover formulation was prepared according to Procedure A with the following ingredients on a % by weight basis. Approximately 0.01 g/gallon Red oil soluble dye was added to color the formulation.

| INGREDIENT | % BY WT. |
| --- | --- |
| BENZYL ALCOHOL | 40.00 |
| AROMATIC HYDROCARBON SOLVENT | 4.40 |
| HYDROXYPROPYL CELLULOSE | 0.45 |
| BENZOTRIAZOLE | 2.00 |
| PARAFFIN WAX | 0.20 |
| AMMONIUM CARBONATE | 4.00 |
| WATER, DISTILLED | 48.95 |
| TOTAL BY WEIGHT | 100.00 |

Portions of the paint remover were used in standard performance tests on painted metal panels and found to be fully satisfactory for paint stripping activity and aluminum corrosion. A control formulation was prepared which was the same in all respects except that ammonia was added in place of ammonium carbonate which in fact was a mixture of ammonium bicarbonate and ammonium carbamate. Paint stripping action decreased even though the Ph was higher (10.5 instead of 8.5) using ammonia rather than the combination of ammonium carbamate and ammonium bicarbonate.

EXAMPLE 2

A water based paint remover formulation was prepared according to Procedure A with the following ingredients on a % by weight basis.

| INGREDIENT | % BY WT. |
| --- | --- |
| BENZYL ALCOHOL | 34.60 |
| AROMATIC HYDROCARBON SOLVENT | 6.80 |
| HYDROXYPROPYL CELLULOSE | 0.25 |
| 2-MERCAPTOBENZOTRIAZOLE | 0.25 |
| OLEIC HYDROXYETHYL IMIDAZOLINE | 0.70 |
| SODIUM SILICATE | 0.30 |
| PARAFFIN WAX | 0.20 |
| AMMONIUM BICARBONATE | 6.60 |
| WATER, DISTILLED | 50.30 |
| TOTAL BY WEIGHT | 100.00 |

Test samples gave improved stripping rates as compared with the water based ammoniated samples of a control formulation which contained ammonia in place of ammonium bicarbonate.

EXAMPLE 3

A water based alkaline paint remover formulation with an in situ equilibrium mixture was prepared with the following ingredients on a % by weight basis.

| INGREDIENT | % BY WT. |
| --- | --- |
| BENZYL ALCOHOL | 37.00 |
| AMMONIUM BICARBONATE | 5.80 |
| AMMONIA (28%) | 6.00 |
| AROMATIC HYDROCARBON SOLVENT | 3.85 |
| 2-MERCAPTOBENZOTRIAZOLE | 0.80 |
| OLEIC HYDROXYETHYL IMIDAZOLINE | 0.70 |
| HYDROXYPROPYL CELLULOSE | 0.25 |
| PARAFFIN WAX | 0.20 |
| WATER | 45.40 |
| TOTAL BY WEIGHT | 100.00 |

In comparison with Examples 1 and 2 this formulation with ammonium bicarbonate neutralized with an excess of ammonia in place of a commercial salt identified as "Ammonium Carbonate" showed superior stripping action for polyurethane in comparison with a formulation containing only ammonia as the activator for the benzyl alcohol solvent system.

EXAMPLE 4

Example 3 was repeated except that the ratio of ammonium bicarbonate to ammonia was varied from 90/10 to 50/50. In all cases superior paint stripping was obtained in comparison with a formulation containing only ammonia. The best stripping results involved using from 60 to 70 parts ammonium bicarbonate with from 30 to 40 parts 28% ammonia. This result is consistent with previous results which showed that ammonium bicarbonate should be the majority species for optimum paint stripping.

EXAMPLE 5

Formulations were prepared as in Examples 1 to 3 except that ammonia was replaced with either a buffering solution of alkali metal bicarbonate or ammonium salt where the Ph was not allowed to be higher than 10.0 or lower than 8.0. No improved stripping activity was observed with: sodium bicarbonate, potassium bicarbonate, ammonium citrate, ammonium formate, ammonium acetate, ammonium nitrate, ammonium sulfate and ammonium oxalate. These results show that the improvement in stripping action is not a Ph effect resulting from buffering, but instead is due to ammonium bicarbonate/carbamate or a chemical equivalent thereof which can decompose to release both ammonia and carbon dioxide.

EXAMPLE 6

Example 1 was repeated except that reagent grade ammonium carbamate was added instead of the commercially available "Ammonium Carbonate". Stripping action was improved relative to the use of only ammonia in the alkaline paint stripper.

EXAMPLE 7

Example 1 is repeated except that no paraffin wax evaporation retardant is added. Stripping action is not influenced, but the composition is not uniform at ambient temperatures due to evaporation.

EXAMPLE 8

The formulation of Example 1 was prepared in commercial size batches and packaged in plastic lined metal drums. The material was shipped to locations where commercial jetliners were to be stripped and repainted and used for its intended purpose. In particular on a jetliner with white paint the formulation gave a raspberry coloration which allowed seeing that a uniform coverage had been obtained in order to avoid missing areas during the application. The stripped paint was then conveniently removed by washing with water. Faster and more uniform stripping was obtained in relation to the use of a formulation with ammonia as the activator. In addition to improved stripping action it was observed that objectionable ammonia odor was reduced during this full scale testing.

What is claimed is:

1. A method of stripping paint comprising the steps:

(1) emulsifying an organic phase comprising benzyl alcohol and an emulsifying agent with an aqueous phase comprising a source of ammonia and carbon dioxide selected from the group consisting of ammonium carbonate, ammonium carbamate, ammonium bicarbonate and ammonium carbamate acid carbonate to produce a water-in-oil emulsion;

(2) applying the water-in-oil emulsion to a painted surface, and (3) washing the painted surface with water to remove the paint.

2. The method of claim 1 where the emulsifying agent is oleic hydroxyethyl imidazoline.

3. The method of claim 1 where a thickening agent is added to the organic phase.

4. The method of claim 3 where the thickening agent is hydroxpropyl cellulose or hydroxypropyl methylcellulose.

5. The method of claim 1 wherein the organic phase of the emulsion further comprises a corrosion inhibitor.

6. A method according to claim 1 wherein the aqueous phase of the emulsion further comprises ammonia.

7. A method according to claim 1 wherein the source of ammonia and carbon dioxide is ammonium bicarbonate.

8. A method of stripping paint from a painted metal comprising:

(a) applying to the painted metal an emulsion comprising
      (i) a continuous organic phase containing benzyl alcohol, and (ii) a discrete aqueous phase containing water and a source of ammonia and carbon dioxide selected from the group consisting of ammonium carbonate, ammonium carbamate, ammonium bicarbonate and ammonium carbamate acid carbonate; and (b) washing the painted metal to remove the paint.

9. A method according to claim 8 wherein the metal is aluminum and the paint comprises polyurethane over an epoxy primer.

10. A method according to claim 8 wherein the continuous organic phase contains an emulsifying agent.

11. A method according to claim 10 wherein the emulsifying agent is oleic hydroxyethyl imidazoline.

12. A method according to claim 8 wherein the organic phase of the emulsion comprises a red dye and paraffin wax.

13. A method according to claim 12 wherein the organic phase of the emulsion comprises a corrosion inhibitor.

14. A method according to claim 8 wherein the organic phase of the emulsion comprises a thickening agent.

15. A method according to claim 14 wherein the thickening agent is hydroxypropyl cellulose or hydroxypropylmethyl cellulose.

16. A method according to claim 8 wherein the aqueous phase of the emulsion further comprises ammonia.

17. A method according to claim 8 wherein the source of ammonia and carbon dioxide is ammonium bicarbonate.

* * * * *